UNITED STATES PATENT OFFICE.

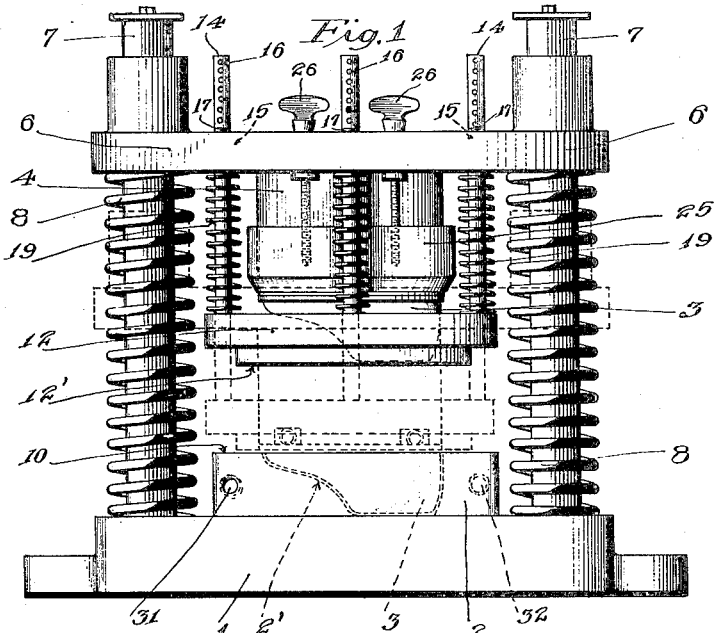
S. STRAUSS.
SHOEMAKING MACHINE.
APPLICATION FILED MAY 19, 1913.
1,131,873. Patented Mar. 16, 1915.

SAMUEL STRAUSS, OF LOS ANGELES, CALIFORNIA.

SHOEMAKING-MACHINE.

1,131,873.     Specification of Letters Patent.     Patented Mar. 16, 1915.

Application filed May 19, 1913. Serial No. 768,669.

*To all whom it may concern:*

Be it known that I, SAMUEL STRAUSS, a subject of the Czar of Russia, residing at Los Angeles, in the county of Los Angeles and State of California, have invented a new and useful Shoemaking-Machine, of which the following is a specification.

The main object of the present invention is to provide a machine for forming the uppers and welts for shoes of one piece of leather.

Another object of the invention is to provide a machine for forming the upper and welt of a shoe and subsequently attaching or basting the sole thereto.

A further object of the invention is to provide in a machine such as above described, means for cutting off the sole after it has been temporarily secured to the welt.

Other objects of the invention will appear hereinafter.

The accompanying drawings illustrate an embodiment of the invention, and referring thereto: Figure 1 is a side elevation of the machine partly broken away, the parts being shown in full lines in normal position, and in dotted lines in position for forming the shoe. Fig. 2 is a vertical section of the machine showing the parts in position for cutting or trimming the sole. Fig. 3 is a section on line $x^3$—$x^3$, in Fig. 2. Fig. 4 is a vertical section of the die, and a lining therefor, showing the upper in place in the die. Fig. 5 is a sectional view of a portion of the last and its supporting means, showing a detachable supporting connection for the last.

The machine comprises a base 1, a die or female die member 2 carried thereby, a form or last 3 conforming to said die, and a follower 4 carrying said last and mounted to reciprocate above said base. Said follower 4 may be carried by a plate or frame 6 mounted to slide on vertical posts or standards 7 surrounded by springs 8 which normally hold the follower and die in elevated position. The machine is intended to be used in connection with any suitable press or means for applying downward pressure onto the plate 6. As any suitable lever or screw press may be used for this purpose, the same is not herein shown as it forms no part of my present invention.

The die 2 is provided with a form or mold cavity 2' corresponding in shape to the outside of the shoe which is to be formed, and the last 3 is formed corresponding to the inside of the shoe. The top of the die is formed as a flat face 10 to receive and support the edge portions of the leather blank from which the shoe is to be formed. In order to hold the edge portions of the blank in position during the forming operation, a clamp member is provided having a flat lower face 12' adapted to rest on top of the leather on the upper face 10 of the die and formed with a hollow space or passage extending vertically therethrough to permit the last and its supporting follower to pass through said clamp member in the vertical movement of the parts. Said clamp member 12 is supported by bars 14 secured thereto and extending through perforations 15 in the vertically movable plate 6, said bars having perforations 16 to receive pins 17 which engage with the top of said plate 6 to limit the descent of the clamp member 12. Springs 19 surrounding said bars 14 tend to hold the clamp member 12 away from the plate 6, but allow downward movement of the plate 6 after the clamp member has ceased to move.

I prefer to provide in connection with the above described forming means, a device for temporarily securing or basting the sole to the upper and for cutting or trimming the sole. In order to enable the operation of such devices on the same machine, the form or last 3 is removably attached to the follower 4, for example, by snap fasteners consisting of buttons 38 on the last engaging with spring sockets 39 on the follower. The die member 2 is provided with a series of nail receivers consisting, for example, of recesses 22 formed in said member and tubes 23 slidably mounted in said recesses and resiliently supported by springs 21, said tubes being adapted to receive the nails and support the nails laterally while they are being forced into the sole. The sole trimming means consisting of a knife 25 is mounted to slide vertically on the follower member 4 and is adjustably secured thereto by screws 26 screwing in said knife and rotatably mounted on said follower member.

An ejector is provided for the formed shoe, consisting of a plate 27 mounted on a spring 29 and movable vertically in a recess 28 in the base 1. The die is preferably provided with means for heating the same, to dry the leather so as to set it in formed condition, said die being for this purpose, provided with a chamber or passage 30 communicating with an inlet pipe 31 and with an outlet pipe 32 to enable heating fluid such as steam to be passed therethrough.

The operation is as follows: The leather blank cut to suitable size for forming the complete upper and welt, is placed over the die 2 and by suitable presser means, the follower 4 is caused to descend. In such descent face 12' of the clamp member first encounters the edge portion of the leather blank, said edge portion of the leather blank being then held tightly between said clamp member and the upper face of the die during the descent of the die or last. Said descent of the follower member 4 brings the form or last 3 against the leather and forces the leather into the die and against the face thereof, so as to conform the leather to the shape of the last and die. The leather is preferably softened by moistening prior to the forming operation, so that it will stretch readily and be shaped to the contour of the last and die and heat is preferably applied to the die by passing heating fluid through the passage 30 aforesaid, so as to cause the leather to be dried, while in the die, sufficiently to preserve its shape when removed therefrom. On then allowing the follower member 4 to rise under the action of the spring 8 the last 3 is withdrawn from the formed upper and welt of the shoe and such upper and welt are then ejected from the die by the action of the ejector member 27. The combined upper and welt member has at this time a form similar to that shown in Fig. 4, with the welt portion 35 extending outwardly from the upper edge of the upper portion, this welt being the portion of the leather which extended over the flat upper face of the die. It will be understood however, that this laterally extending portion of the leather blank is considerably wider than what is required for the welt of the shoe and in order to trim such portion of the welt and to facilitate fastening the sole onto the welt and trimming such sole simultaneously with the upper, I provide the knife 25 and the devices coöperating therewith.

The operations of attaching and cutting the sole may be performed on each shoe directly after the formation of the upper, or in order to save time, a number of uppers may be formed and the same or a different machine may then be used to attach and cut the soles. The latter operation is performed as follows: Suitable nails or wire fasteners indicated at 37 are placed in the supporting means 23 therefor, and the formed upper is placed in the die with its welt extending over the flat upper face of the die and over the said fastening means 37. The sole indicated at 36 is then placed over the welt, the last 3 is removed from the follower and the follower is then brought down by the application of pressure thereto so as to bring the clamp member 12 down against the sole and to force the sole and welt down onto the fastening means 37 which are thereby forced through the welt and sole to baste or temporarily fasten them together. During this operation the knife 25 is supported in position relative to the follower plate, such as shown in Fig. 1, so that the descent of the follower plate does not bring the knife into effective operation. The upper with the sole attached thereto by the fastening means 37 is then removed from the die and the welt is sewed to the sole by a seam extending close to the junction of the upper with the welt. The upper is then replaced in the die and the knife 28 having been adjusted to position relative to the follower shown in Fig. 2, the follower is brought down by pressure applied thereto so as to cause the knife 25 to cut the sole and welt to the required form. In order to prevent injury to the knife and to secure effective cutting action, a bed 40 is preferably provided in the die against which the cutting edge of the knife engages after it has passed through the sole and welt, this bed being formed of lead or other suitable material. In order to save time, any number of shoes may be basted with a single adjustment of the machine and the same machine or another machine being then used to perform the cutting operation.

In case thin leather is used for making the shoe, it will in general be desirable to provide a thin die lining indicated at 33 in Fig. 4, which is formed for example, by placing a sheet of malleable metal such as aluminum over the die and beneath the leather blank and then bringing the die down on top of the leather so as to form the leather and the lining simultaneously in conformity with the die. The lining 33 is ejected along with the upper and forms a temporary support for the upper to retain it in shape during the manipulation thereof in sewing etc. The portion of this lining extending outwardly from the upper is trimmed off so as to leave the leather welt exposed for basting. Such a lining, once formed, may be used over again indefinitely with new blanks.

By using a number of such linings nesting within one another, the same female die may be used to form all of the shoes of different sizes in a certain line, thereby reducing the number of dies required to a minimum. Moreover, by making this lining thicker at any desired point, the leather of the shoe at such point may be made correspondingly thinner by the operation of the last and die, as for example, it is possible by this means to make the toe portion of the shoe thinner than the counter portion.

What I claim is:

1. A shoe forming machine comprising a female die member, a last, a supporting means for said last mounted to reciprocate the last into and out of the die, and a clamp member mounted to reciprocate with said supporting means and elastically supported thereon to enable said clamp member to move toward the die to clamp a leather blank between the die and clamp member and to permit further movement of the last after the clamp member has been moved to clamping position.

2. In a shoe-making machine, a female die and die coacting means for pressing the shoe upper into shape and for forming a flange on said upper, fastener supporting means on said die and a clamp for clamping said flange and the sole against said fastener supporting means to drive the fasteners through said flange and sole to baste the same together while the upper is in the die.

3. In a shoe making machine, the combination of a female die having a flat face and provided with a die recess in said face adapted to receive the upper of a shoe, and to permit a laterally extended welt portion of said upper to rest on the said flat face of said die, a follower member mounted to reciprocate adjacent said die and a knife carried by said follower member to cut the sole and the welt portion of the upper while in position on said die.

4. In a shoe making machine, the combination of a female die having a flat face and provided with a die recess in said face adapted to receive the upper of a shoe, and to permit a laterally extended welt portion of said upper to rest on the said flat face of said die, a follower member mounted to reciprocate adjacent said die and a knife carried by said follower member to cut the sole and the welt portion of the upper while in position on said die, said knife being adjustably mounted on said follower member.

5. In a shoe forming machine the combination of the female die, a removable lining therefor, and a last movably mounted to enter said die and form the leather between the last and lining.

6. A shoe-forming machine comprising a female die and die coacting means for forming a shoe upper and a sole securing flange on the upper of one piece of material, and means for trimming said flange.

7. A shoe-forming machine comprising a female die, die coacting means for forming a shoe upper and an outwardly extending sole securing flange on the upper, means for holding the sole upon said flange, and means for trimming said flange and sole.

In testimony whereof, I have hereunto set my hand at Los Angeles, California, this 12th day of May, 1913.

SAMUEL STRAUSS.

In presence of—
ARTHUR P. KNIGHT,
MARTHA M. LANGE.